United States Patent [19]

Schäfer

[11] Patent Number: 4,648,517
[45] Date of Patent: Mar. 10, 1987

[54] SHELF SUPPORT STRUCTURE

[75] Inventor: Gerhard Schäfer, Neunkirchen-Salchendorf, Fed. Rep. of Germany

[73] Assignee: Fritz Schäfer Gesellschaft mit beschränkter Haftung, Fed. Rep. of Germany

[21] Appl. No.: 779,669

[22] Filed: Sep. 24, 1985

[30] Foreign Application Priority Data

Sep. 26, 1984 [DE] Fed. Rep. of Germany ....... 3435246
Dec. 24, 1984 [DE] Fed. Rep. of Germany ....... 3447300

[51] Int. Cl.⁴ .............................................. A47F 5/00
[52] U.S. Cl. ................................... 211/183; 211/182; 211/189; 211/192; 211/195; 211/201; 108/111; 403/188; 403/190
[58] Field of Search ............... 211/182, 183, 189, 186, 211/191, 192, 195, 201; 108/111; 403/187, 188, 189, 190, 191, 197

[56] References Cited

U.S. PATENT DOCUMENTS

| | | | |
|---|---|---|---|
| 3,475,044 | 10/1969 | Konstant | 211/192 |
| 3,698,567 | 10/1972 | Fenwick | 211/183 |
| 3,871,525 | 3/1975 | Al-Dabbagh et al. | 211/182 |
| 3,999,875 | 12/1976 | Simon | 211/189 |
| 4,030,612 | 6/1977 | Gray | 211/182 |
| 4,064,996 | 12/1977 | Shillum | 211/191 |
| 4,067,445 | 1/1978 | Derclaye | 211/191 |
| 4,142,637 | 3/1979 | Kraiss | 211/182 |
| 4,423,817 | 1/1984 | Monj-Rufi | 211/191 |

FOREIGN PATENT DOCUMENTS

| | | |
|---|---|---|
| 0077885 | 5/1983 | European Pat. Off. . |
| 3323503 | 1/1984 | Fed. Rep. of Germany . |
| 203388 | 6/1939 | Switzerland ........................ 211/149 |

Primary Examiner—Richard J. Scanlan, Jr.
Assistant Examiner—Anthony Knight
Attorney, Agent, or Firm—Toren, McGeady and Goldberg

[57] ABSTRACT

A shelf support structure with upright posts of sheet metal sections and horizontal braces of sheet metal sections, connecting these with each other, provides with a simple structure an inherently stable connection between the posts and the horizontal braces. The sheet metal sections of the posts have an aperture at one longitudinal side and are symmetrical in cross-section with respect to a plane crossing this aperture. The aperture is terminated on both sides by flanges protruding outwardly at right angles from the walls adjoining it and a longitudinal ledge protruding into the post is located opposite the aperture, symmetrically to the plane crossing the aperture. The horizontal braces engage with their ends into the sheet metal sections forming the posts up to the wall lying opposite the aperture and are there equipped with an indentation in whose area they embrace the longitudinal ledge in the posts in a fork-like manner.

12 Claims, 13 Drawing Figures

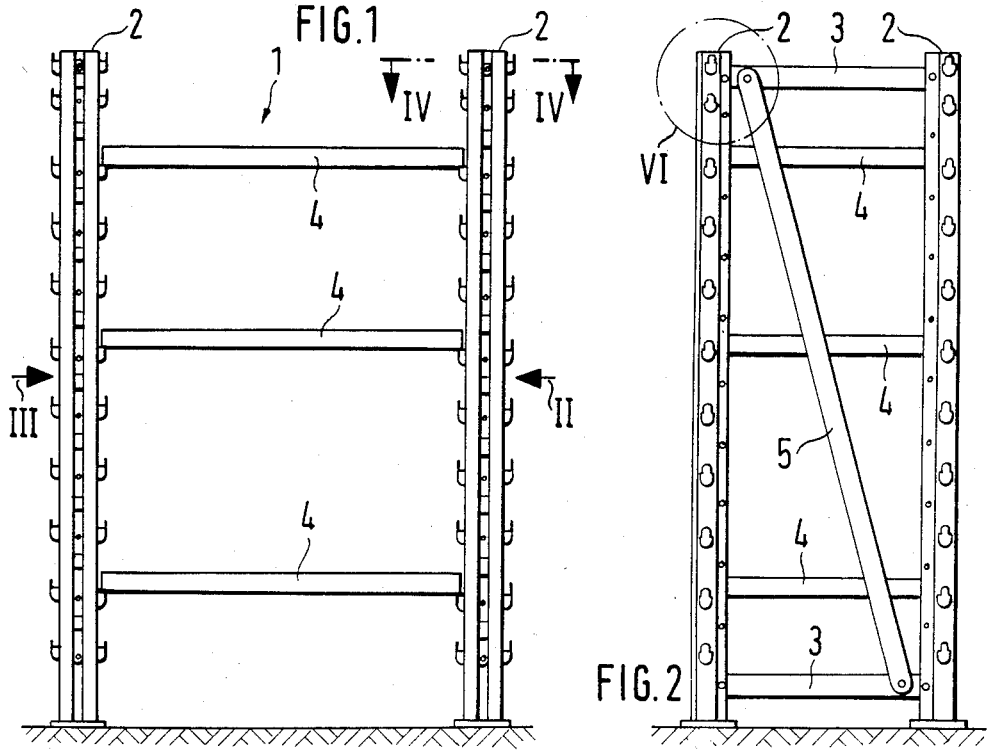
FIG. 1
FIG. 2
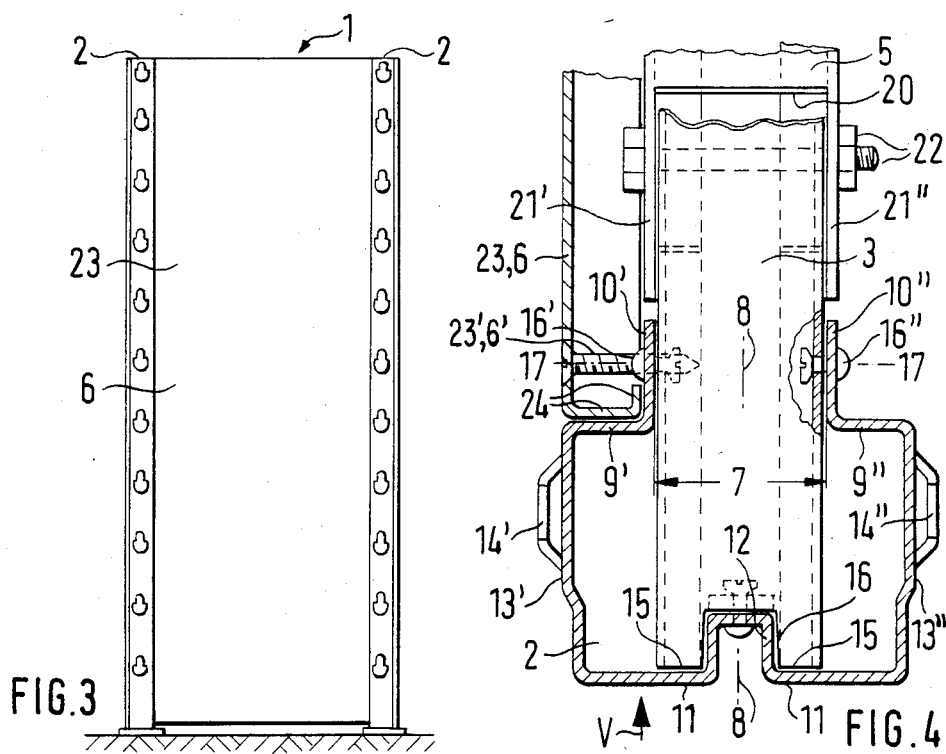
FIG. 3
FIG. 4

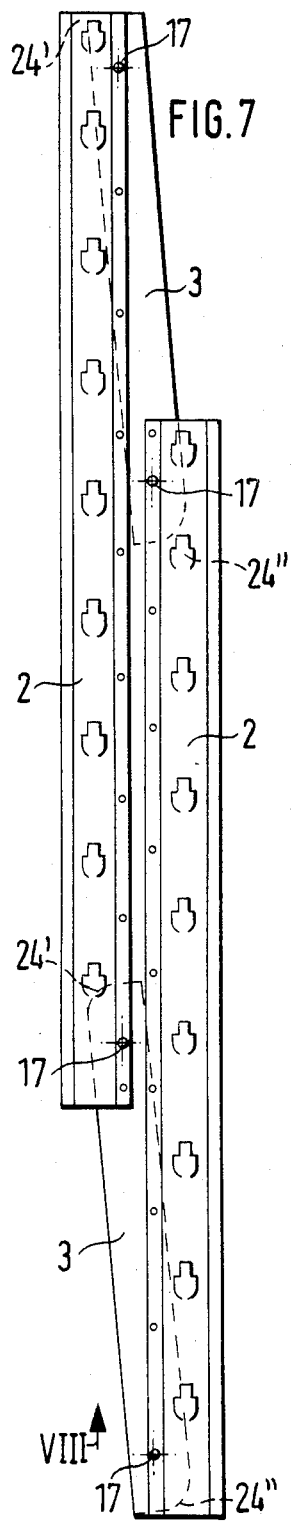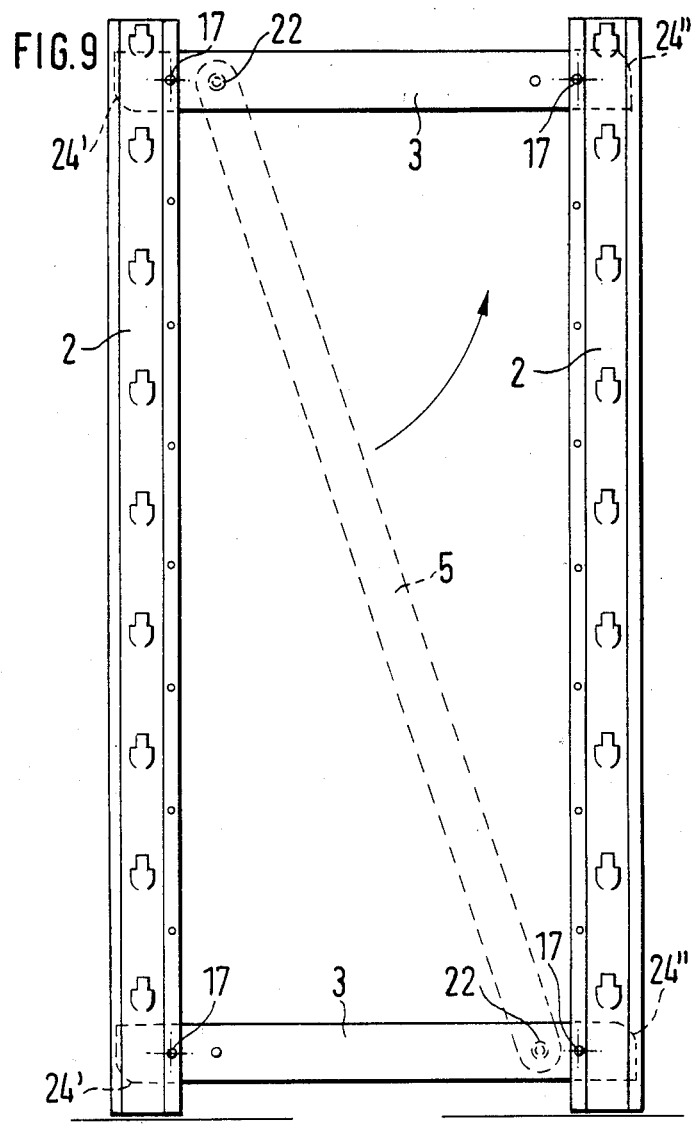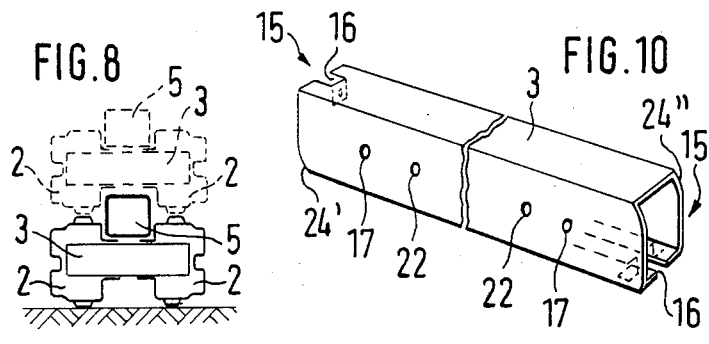

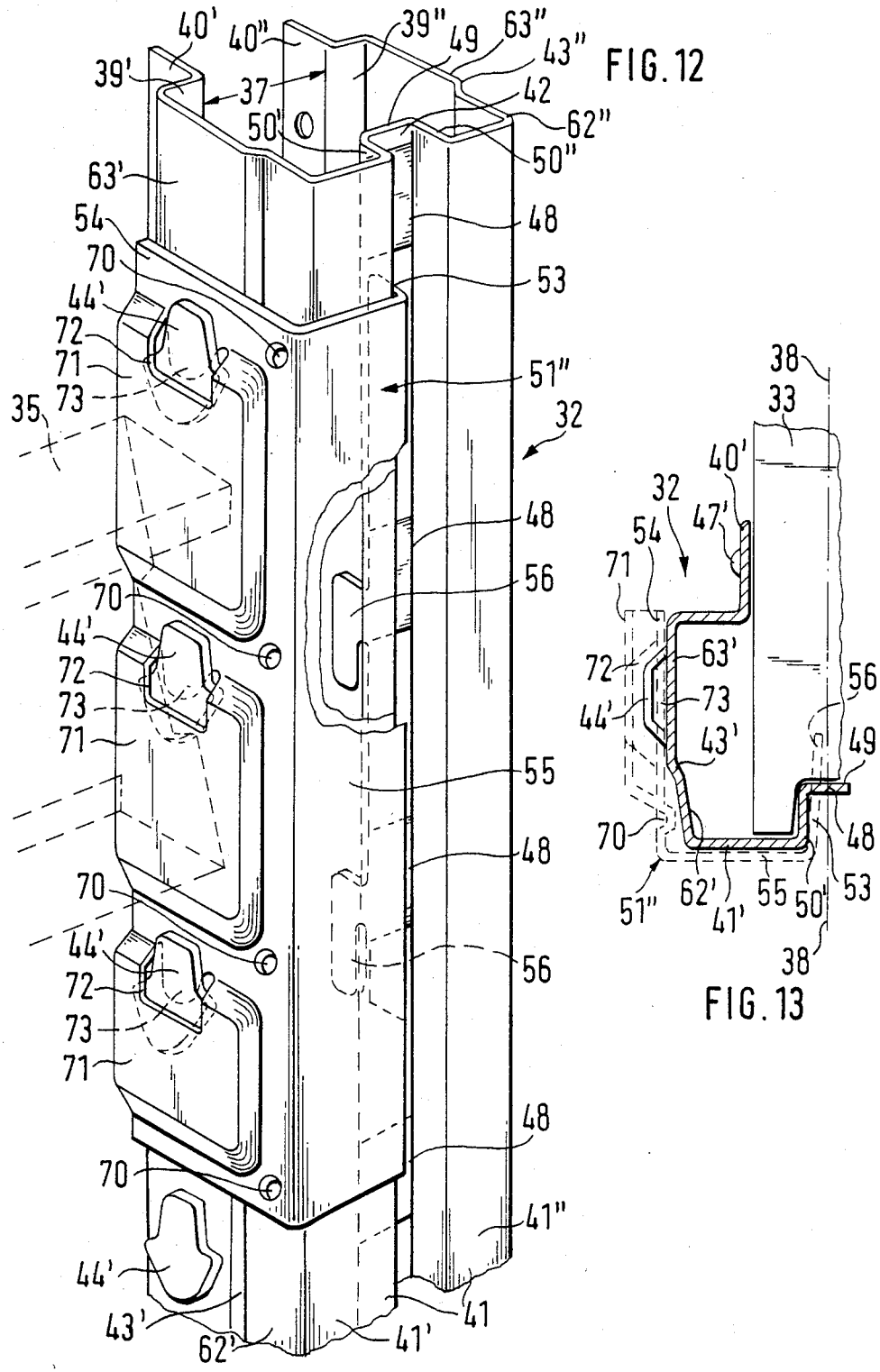

SHELF SUPPORT STRUCTURE

BACKGROUND OF THE INVENTION

The invention relates to a shelf support structure with upright posts from sheet metal sections and horizontal braces, also formed from sheet metal sections, which connect these posts one with each other.

The sheet metal sections of the posts have an aperture at a longitudinal side and are designed to be symmetrical in cross-section with respect to a plane crossing of this aperture. Furthermore, the aperture is bounded on both sides by a flange which protrudes outwardly at right angles from its adjoining walls and a longitudinal bead/or ledge protruding into the sheet metal section is molded symmetrically to the plane crossing the aperture into the wall located opposite to the aperture, while the sheet metal sections of the horizontal braces have at least one U-shaped or C-shaped cross section and, with their longitudinal opening, directed upwards or downwards, engaged with their ends into the aperture of the posts and are connected or connectable with the flanges and bordering on the aperture.

Shelves of this type are already known, as for instance can be gathered from EP-A-No. 0077885 and the DE-A-No. 33 23 503.

In the shelf according to EP-A-No. 0077885, the horizontal braces are guided with their ends in such a manner in the area between the flanges of two posts which border the aperture, that they terminate flush with the rear side of the walls carrying the flanges and are connected rigidly with the posts at least by welding seams formed along the free longitudinal edges of the flanges.

For obtaining increased stability of the connection between the posts and the horizontal braces according to the EP-A-0077885, additional diagonal cross ties are provided between the two posts and are welded to the posts in the vicinity of their ends along the flange edges.

In the shelf according to the DE-A-No. 3323503 detachable connections between the posts and the horizontal braces are provided which work in accordance of shelf clampings wedge couplings together over thin or tongue shaped members, which are recessed at the posts and on the horizontal braces.

In the two previously known types of shelves, it is of disadvantage that the forces acting upon the horizontal braces must be carried exclusively by the flanges of the posts which flanges limit the apertures on both sides, while the remaining cross sectional areas of the posts are not subjected to any direct introduction of forces. Actual practice has, however, shown that the inherent stability of the frame systems of such shelves formed of two posts and at least two horizontal braces is impaired, and indeed in direction parallel as well as transversely to their plane.

In order to overcome these disadvantages, it is the object of the invention to provide a shelf of the type explained in detail above, in which in a simple manner an optimum force transmitting connection between the upright posts and the horizontal braces is assured and thereby the inherent stability of the frame systems formed of two posts and at least two horizontal braces is improved.

SUMMARY OF THE INVENTION

This object is met in accordance with the invention in that the horizontal braces reach with their ends to the wall lying opposite the aperture in the sheet metal sections forming the posts and have a recess in whose area they engage the longitudinal bead or ledge in the post in a fork like manner.

It is of advantage that the ends of the horizontal braces protrude through the entire depth of the sheet metal sections forming the posts and find sidewise support in these walls sections spaced with considerable distance opposite each other.

In accordance with a further development of the invention, it is provided, that the horizontal braces are attached or attachable at each flange of the posts by a rivet or bolt or screw connection and a third connecting point can be formed between each end of the horizontal braces and the posts by a rivet or a screw, which engages on the one hand at the angled lug in the area of the recess of the horizontal braces and on the other hand in a wall of the longitudinal bead or ledge of the posts. Such a three point connection improves the engagement between the posts and the horizontal braces to a considerable degree.

Since the rivet and/or bolt connection between the posts and horizontal braces can be fabricated in a simple and reliable manner, the posts and the horizontal braces together with all the members required for the assembly of the shelves can be packaged, shipped and stored in a space-saving manner and can then be assembled at the place of use easily and safely.

In accordance with another advantageous feature of the present invention, that the two riveted or bolted connections between the horizontal braces and the flanges of the posts are axially aligned with each other and form a connecting articulation with each other, while the third riveted or bolted connection between the lugs of the horizontal braces and the longitudinal bead or ledge of the posts can be made to act as a blocking connection for the connecting articulations. Two posts and at least two horizontal braces can in this case be already connected with each other in the fabricating plant in such a manner that they can be displaced relatively to each other similar to a parallelogram. The folded together state of this parallelogram will then require less storage for packing, storing and shipping. At the place of use of the shelves the parallelogram must merely then be brought into the rectangular frame shape and the relative position of the posts and horizontal braces with respect to each other can then be secured by attachment of the third riveted or bolted connection.

For additional stabilization of a shelf of the last described construction, an important feature according to the invention provides that a diagonally extending compression rod as stiffening tie is connectable with an upper and a lower horizontal brace provided for connecting of two posts.

It is particularly to be recommended that the compression rod has fork-shaped ends, with which it embraces the horizontal braces and with which it is couplable by means of a detachable bolt and pin connection. The stiffening tie acting as a compression rod can consist of the same sheet metal sections as the horizontal braces. Then it is only necessary to bend the side wall sections outwards to the extent of their material thickness, which wall sections form the fork-shaped ends of the stiffening ties, so that they can embrace the side walls of the horizontal braces.

It may also be advisable to provide the recesses at the stiffening ties acting as compression rods in such a manner, that the edges of their transverse walls abut against the adjoining walls of the horizontal braces, when the stiffening tie assumes its diagonal acting position between the upper and lower horizontal brace.

Instead of or in addition to the stiffening ties acting as compression rods, the possibility has also been provided in the invention to attach side walls as stiffeners in the stepped portions bounded by the flanges of the longitudinal gap in between two posts facing each other.

The invention furthermore aims that the loads occurring in actual practice can be accepted in optimum manner by the connecting members provided between the posts and can be carried into the posts at the same time as assuring a high inherent stability and steadiness of the shelf.

This aim is achieved in accordance with the invention in that the longitudinal bead or ledge in the post is provided with suspension and/or detent members for the engagement members which are located at the free legs of the coupling shoes of horizontal braces, which in cross section are approximately U-shaped or L-shaped, wherein the coupling shoes embrace the cross sectional area of a post in a matching manner, which is enclosed between one longitudinal side wall and the adjoining side wall of the longitudinal bead or ledge.

Another important advantage of the present invention is the feature whereby the longitudinal side walls of the posts in their area adjoining the longitudinal bead or-ledge have a stepped cross sectional constriction as against the area comprising the suspension or detent members, whose depth at least approximates the leg thickness of the coupling shoes.

The coupling shoes can comprise at their leg respectively several projections or knobs spaced above each other, which are arranged spaced from the corner transition to the web and which protrude above the inner side of the leg by a dimension which corresponds to the depth of the cross-sectional constriction at the post.

The cross-sectional constrictions at the posts may extend inclined at acute angles against the plane of the longitudinal side walls, while the side walls of the longitudinal beads or ledges have an inclinational position opposite hereto and thereby respectively extend at obtuse angles to the bottom of the longitudinal bead or ledge as well as to the neighboring sections of the post walls.

It is however also important that on the one hand the leg of the coupling shoe has an inclination position adapted to the side walls of the post longitudinal bead or ledge, while on the other hand the depth of the knobs or lugs in the leg is adapted to the inclination position of the cross-sectional constriction of the post.

Finally, it is also important for the inherent stability and steadiness of the shelf that the recess at the ends of the horizontal brace is adapted to the inclined position of the side walls of the post's longitudinal bead or ledge as far as its contour shape is concerned, and that the ends of the horizontal brace in its active position assume a certain distance from their neighboring areas of the post wall. The stabilizing support action is here achieved between the inclined side walls of the longitudinal bead or ledge and the inclined side flanks of the end runs in the horizontal braces.

It should be mentioned additionally, that it is known, for instance through DE-A-No. 99091, to design shelves with upright posts together with their connecting horizontal braces by means of articulations installed between the posts and the horizontal braces in such a way that they can be folded in a space-saving fashion for the purpose of packaging, storage or shipping, while in their position of use, they can be locked by means of diagonally extending compression rods acting as stiffener ties. However, this known shelf has no other essential points of contact with a shelf accordance with in the invention.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a schematically simplified front view of the overall construction of a shelf;

FIG. 2 shows the shelf according to FIG. 1 viewed in direction of arrow II;

FIG. 3 shows the shelf according to FIG. 1 viewed in direction of arrow III;

FIG. 4 is a horizontal sectional view along line of IV—IV in FIG. 1 in approximately normal size;

FIG. 7 shows an advantageous variation possibility for an inventive shelf in a side view derived from FIG. 2;

FIG. 8 is a view in direction of arrow VIII on the construction variation of a shelf according to FIG. 7;

FIG. 9 shows the shelf according to FIGS. 7 and 8 in its position of use;

FIG. 10 is a perspective view of a detail of the construction type of the shelf according to FIGS. 7 to 9;

FIG. 12 is a perspective view of a partial area of a shelf in modified design corresponding to FIG. 5; and FIG. 13 is a horizontal section through the left half of the shelf partial area according to FIG. 12.

DETAILED DESCRIPTION OF THE INVENTION

Figure 5:
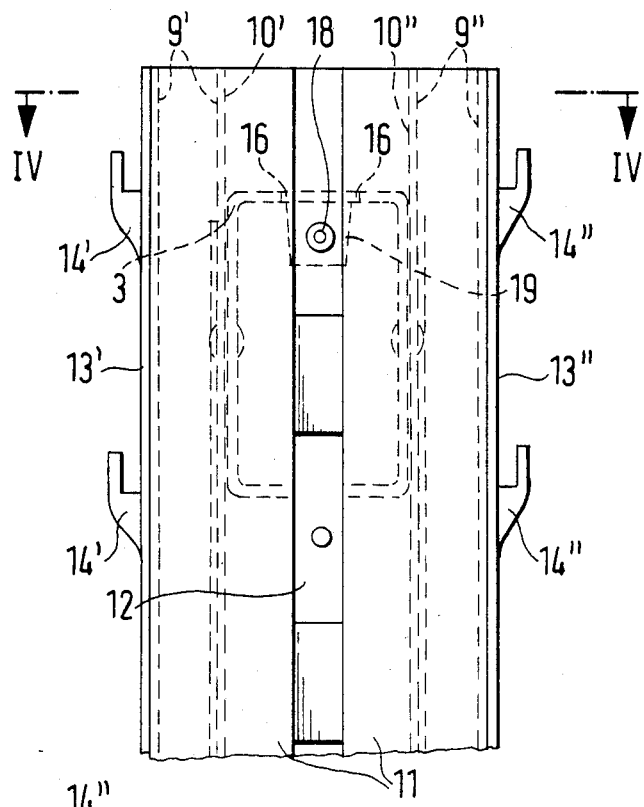
FIG. 5 is a view in direction of the arrow V of FIG. 4.

FIGS. 1 to 3 show a shelf 1 which can be assembled from at least four constructionally identical posts 2, at least two horizontal braces 3 and several compartment bottoms 4 and makes possible the utilization of additional constructional members, for instance stiffening ties 5 and/or stiffening walls 6.

Each of the four posts is a sheet metal section fabricated for instance by bending, which comprises an aperture 7 at a longitudinal side and is designed symmetrical in cross section with respect to a plane 8—8 crossing the aperture 7.

The aperture 7 of the posts 2 is terminated by a flange 10' and 10" protruding outwardly at right angles from the walls 9' and 9" adjoining it, while a longitudinal bead or ledge 12 protruding into the sheet metal section is molded into the wall 11 lying opposite the aperture 7, again symmetrically to a plane 8—8 crossing the aperture 7. At both side walls 13' and 13" the posts 2 are provided with hanging or suspended detents or lugs 14' and 14" equally distributed along their longitudinal direction, as is clearly shown in FIGS. 1 to 3.

The horizontal braces 3 also are formed of sheet metal sections, which have at least one U-shaped or C-shaped cross section and are directed with their longitudinal opening toward the top or the bottom, as can be seen particularly clearly from FIG. 5.

Figure 6:
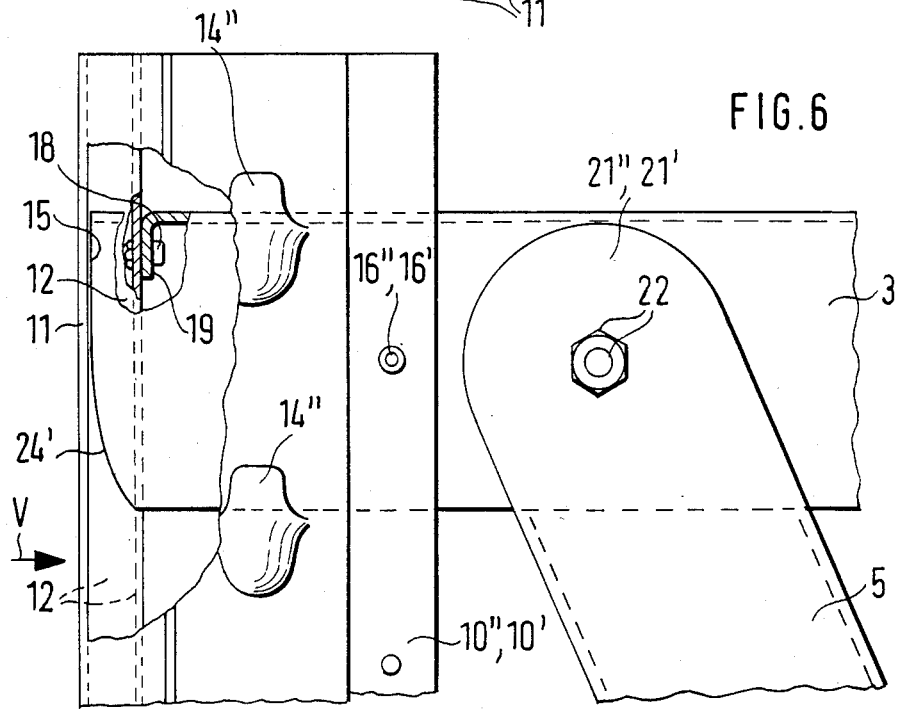
FIG. 6 shows the upper end section of a shelf designated with VI in FIG. 2 in approximately normal size.

The horizontal braces 3 engage through the aperture 7 into the sheet metal sections forming the posts 2 to such an extent that their ends 15 reach up to the wall 11 lying opposite the aperture 7, as can be seen particularly clearly in FIGS. 4 and 6. The ends 15 of the horizontal braces 3 are equipped with an indentation or recess 16, in such a way that they can embrace the longitudinal bead or ledge 12 in the area of this indentation 16 in a fork like manner, as can be seen in FIG. 4. The connection of the horizontal braces 3 with the posts 2 is accomplished respectively at three places, namely on the one hand at both flanges 10' and 10" by means of rivets 16' and 16" or also screws, which are in an aligned position to the common axis 17—17. The third retaining connection, which can also be made by means of a rivet 18 or by means of a screw, is provided between the longitudinal bead or ledge 12 and a lug 19, which is angled out of the wall of the horizontal braces 3 (FIGS. 4 to 6) in the area of recess 16.

By means of the rivet or screw connection 16', 16" and 18 the horizontal braces 3 are connected with the posts 2 respectively at three points having a relatively large distance from each other and apart from that are provided stable sidewise supports in the posts on the one hand between the two flanges 10' and 10" as well as on the other hand by means of the fork shaped engagement connection of their ends 15 comprising the recess 16 with the longitudinal bead or ledge 12. A high inherent stability of the frame systems formed from two posts 2 and at least two horizontal braces 3 is hereby assured.

An effective stiffening of these frame systems can be achieved by means of an additional use of diagonally extending compression rods 5, which engage as stiffening ties for instance near to the left end at the upper horizontal brace 3 and near to the right end at the lower horizontal brace 3, as can be seen from FIG. 2.

The diagonal braces 5 can be manufacturered from the same sheet metal section as the horizontal braces 3. They must merely be equipped at each end with a recess 20 in such a manner that side cheeks 21' and 21" remain standing there, with which they can embrace the horizontal braces possibly after an appropriate bending operation, as can be seen from FIGS. 4 and 6.

By means of a pin and screw connection 22 the diagonal braces 5 are then connected to the horizontal braces 3 and thus stabilize the frame system consisting of two posts 2 and at least two horizontal braces 3 in its rectangular functional position according to FIG. 2.

Additionally to the diagonal braces 5 or instead of same, side walls 23 formed from sheet metal can also be used for the stabilization of any frame system composed of two posts 2 and at least two horizontal braces 3, which engage with their frame edges 24 into the steps between the walls 9', 9" and the flanges 10' and 10" of the posts 2, as can be seen from FIG. 4. Side walls 23, as well as the stiffening walls 6, are fastened to the posts 2 by means of screws 6', 23'.

The positional securing of the side walls 23 is for instance accomplished by means of sheet metal screws, which engage near to the frame edges 24 through the side walls 3 into the flanges 10', 10" of the posts 2.

FIGS. 7 to 10 of the drawing show a design of a shelf 1 which can be shaped with minor modifications or supplementary measures in such a manner that the frame systems composed of two posts 2 or two horizontal braces 3 can already be pre-assembled at the factory, but can be folded together in parallelogram fashion in a space-saving manner for packaging, storage and shipping.

For the mentioned purpose it is merely necessary to connect the horizontal braces 3 with the two posts 2 by means of rivets or screws 16', 16" in alignment position with the axis 17—17 in an articulated but tight fashion as well as to provide the ends 15 of the two horizontal braces with a rounding off radius 24' or 24" around the articulation axis 17 at diagonally opposite corners, which rounding off radius extends at the most over half the cross sectional height of the horizontal braces 3, as this can be gathered from FIGS. 7, 9 and 10. On the basis of this design then the frame systems composed of two posts 2 and two horizontal braces 3 can be changed over in parallelogram fashion from the folded state visible in FIG. 7 and the state of use visible in FIG. 9, wherein in the state of FIG. 9 the straight section at the ends 15 of the horizontal braces 3 assume a support position as support stops against the wall 11 of the post 2, while at the same time there indentation 16 embraces the longitudinal bead or ledge in a fork-like manner. By attaching the rivet or screw connection 18 between the lugs 19 of the horizontal braces 3 and the longitudinal bead or ledge 12 of the post the functional attitude of the frame system is then fixed according to FIG. 9 as well as being additionally secured by insertion of the diagonal brace 5 and/or possibly also the side walls 23.

FIG. 8 shows the a space saving manner in which two frame systems for formation of a shelf 1 and the associated diagonal braces 5 can be packaged, stored and shipped.

Figure 11:
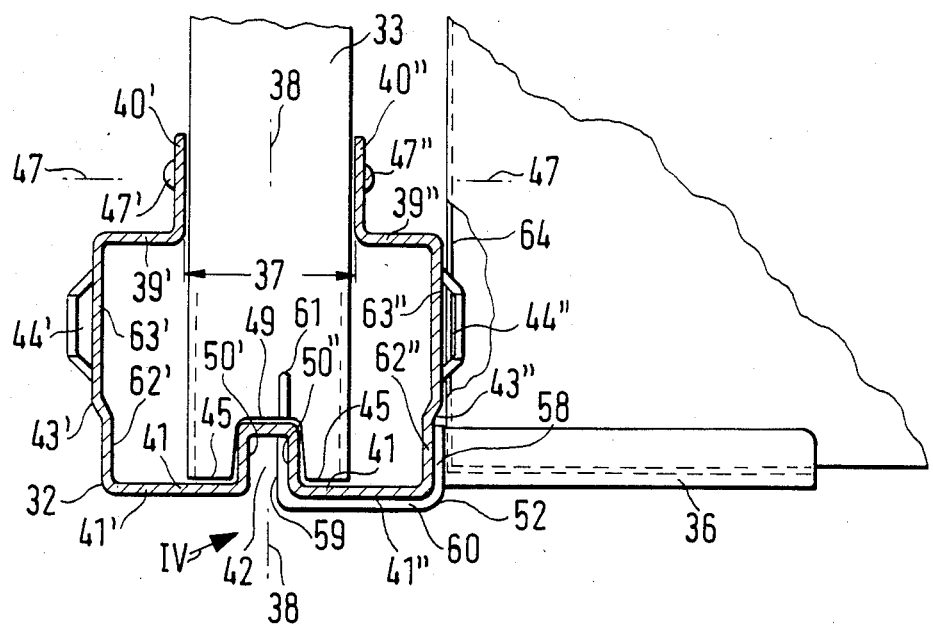
FIG. 11 shows a horizontal section of a further development of the shelf design corresponding to FIG. 4.

FIGS. 11 to 13 of the drawing show further development measures of a shelf 1 which serve to further improve its inherent stability and steadiness.

Reference numerals are utilized in FIGS. 11 to 13 which have been increased by three decades as against the reference numerals used in FIGS. 1 to 10. Thus, there the posts have the reference numeral 32, while the horizontal braces are designated by the reference numeral 33, etc.

Each post 32 includes a sheet metal section fabricated by a bending operation and has an aperture 37 at a longitudinal side and is designed to be symmetrical in cross section with respect to a plane 38—38 crossing this aperture 37.

The aperture 37 of the post 32 is terminated on both sides by a flange 40' and 40" protruding outwardly at right angles from the walls 39' and 39" in the neighborhood of the aperture, while in the wall 41 lying opposite the aperture 37 also symmetrical to the plane 38—38 crossing the aperture 37 is molded the longitudinal bead or ledge 42. At both side walls 43' and 43" the post 32 is provided with hanging and/or detent elements 44' and 44" uniformly distributed in its longitudinal direction.

The horizontal braces 33 engage through the aperture 37 into the sheet metal section forming the posts 32, and indeed to such an extent, that their ends 45 reach up to the walls 41 lying opposite to the aperture 37, as can be seen in FIG. 11. The ends 45 of the horizontal braces 33 are provided with the recess 46, in such a way that in the area of this recess 46 they can embrace the longitudinal bead or ledge 42 in the posts 32 in a fork-like manner (FIG. 11). Rivets 47' and 47" which have a position aligned with a common axis 47—47 serve to connect the horizontal braces 33 and the posts 32. It is however also possible to use screws here, in order to create a favorable movable connection between the horizontal braces 33 and the posts 32 around the axis 47—47. A stable sidewise abutment results between the posts 32 and the horizontal braces 33, and indeed on the one hand by means of the two flanges 40' and 40" as well as on the other hand by means of the fork shaped engagement connection of the ends 45 of the horizontal brace 33 comprising the recess 46 with a longitudinal bead or ledge 42. Because of this, a high inherent stability of the frame systems formed of two posts 32 and at least two horizontal braces 33 is assured.

An additional particularly effective stiffening of the shelf 1 is achieved through the utilization of horizontal traverses 35 and 36, of which the horizontal traverses 36 is recognizable in FIG. 11 and the horizontal traverse 35 in FIG. 12.

The horizontal traverses 35 and 36 are fabricated from sheet metal sections as are the posts 32 and the horizontal braces 33. While the horizontal traverse 35 has a Z-shaped cross section (FIG. 12), the horizontal traverse 36 exhibits a sidewise open cross sectional profile of for instance a C-shaped cross section.

The posts 32 comprise, apart of their suspension and/or detent elements 44', 44", additionally also suspension and/or detent elements 48 in the area of their longitudinal beads or ledges 42, which consist of simple slits or indentations. They are located respectively in the base 49 of the longitudinal bead or ledge 42, and they are arranged at least to be directly adjoining at their side walls 50' and 50".

The suspension and/or detent elements 48 are arranged to be offset with respect to their height position as against the suspension and/or detent elements 44' and 44", as can be seen from FIG. 12.

A coupling shoe 51" (FIGS. 12 and 13) is attached at each end of the horizontal traverses 35, while a similar coupling shoe 52 is located at the ends of the horizontal traverses 36 (FIG. 11).

The coupling shoes 51" or 52 have an approximately U-shaped or L-shaped cross section and are fabricated as sheet metal parts.

According to FIGS. 12 and 13, the coupling shoes 51" have two legs 53 and 54, which are in single piece connection with each other by means of a web 55. The leg 53 having the smaller width is provided with engagement members 56 molded in one piece with it in the shape of hooks angled off in the leg plane, which can be brought into engagement with the slits or indentations in the base 49 of the longitudinal beads 42, which serve as detent members 48.

The other broader leg 54 of the coupling shoe 51" also carries respectively several engagement members, indeed it is equipped with several, for instance three, outwardly directed extrusions 71 which are spaced one above the other, each of which has a perforation 72 in the area of its upper edge, while on the other hand a hook 73 directed downward remains standing in the plane of the leg 54.

During the hanging or suspending operation of the coupling shoes 51" at the posts 32, their hooks 73 engage from above behind the suspension and/or detent members 44' or 44" of the post 32, while at the same time the suspension and/or detent members 44' or 44" protrude from below through the openings 72. This design of a coupling shoes 51" results because of the provided extrusions 71 in an increased inherent stability and additionally in an improved engagement connection with the posts 32.

Since the extrusions can be liberally dimensioned, there result good welding faces for the horizontal traverses 35.

The co-action of the individual coupling shoes 51" according to FIG. 12 with a post 32 is also evident from FIG. 13. FIG. 13 also shows clearly that the posts 32 can have modified profiling as against FIG. 11.

The difference compared to the profile shape according to FIG. 11 lies in case of the posts 32 according to FIG. 7 in that on the one hand the stepped cross sectional constrictions 62' and 62" are arranged to be inclined at an acute angle opposite the plane of their longitudinal side walls 43' or 43". On the other hand however, the side walls 50' or 50" of the longitudinal bead or ledge 42 have a corresponding oppositely directed inclinational position. They extend at an acute angle with respect to the base 49 of the longitudinal bead or ledge 42 and to the sections 41' or 41" of the post walls 41 adjoining it.

By an appropriate design of the legs 53 and the projections or knobs 70 at the coupling shoe 51" a particularly good wedge-like coupling connection with the posts is assured.

Since, according to FIG. 13 not only the side walls 50' or 50" of the longitudinal bead or ledge 42, but also the side flanks of the indentation 46 associated with them have a matched inclinational position in the ends 45 of the horizontal braces 33, they can, in the active position of the horizontal braces 36, support each other in a wedge-like bracing manner and thus cause good mutual introduction of forces, even though the ends 45 of the horizontal braces 33 maintain a certain distance from the inside faces of the wall sections 41', 41" of the posts 32, as can be seen in FIG. 13.

The coupling shoes 52 of the horizontal traverses 36 have a similar design as the coupling shoes 51", i.e., they comprise a U-shaped or L-shaped cross section with two parallel legs 58 and 59 as well as web 60 connecting these in one piece. Again the leg 58 has a smaller width than the leg 59, whereby in this case only the leg 59 carries engagement members 61 in the shape of hooks, which are designed to be angled in the plane of the leg.

The coupling shoe 52 engages with the leg 59 carrying the engagement members 61 into the longitudinal bead or ledge 42 of the posts 32, and indeed in such a way, that the engagement members 61 designed as hooks penetrate the suspension and/or detent members 48 formed by slits or indentations in the base 49 of the longitudinal bead or ledge 42 and clamp themselves there in a hook-up. Leg 59 rests with the other side tightly at one of the side walls 50' and 50" of the longitudinal bead and ledge 42, while at the same time the leg 58 with its other side comes to rest at one of the longitudinal side walls 43' or 43", and indeed in the area of a cross sectional constriction 62' or 62", which is offset backwards, as against the area 63' or 63" of the longitudinal side walls 43', 43" carrying the suspension and/or detent members 44' or 44", by an amount which corresponds at least to the material thickness of the leg 58 of the coupling shoes 52. The width of these cross sectional constrictions 62' or 62" is thereby matched to the width of the leg 58.

While specific embodiments of the invention have been shown and described in detail to illustrate the application of the inventive principles, it will be understood that the invention may be embodied otherwise without departing from such principles.

What is claimed is:

1. A shelf support structure comprising upright posts of sheet metal sections and horizontal braces connecting the posts with each other, the horizontal braces formed of sheet metal sections, the posts defining an aperture at a longitudinal side thereof and formed symmetrical in cross-section with respect to a vertical plane extending transversely of the aperture, the aperture bounded on both sides by flanges protruding outwardly at right angles from the walls adjoining the aperture, and a longitudinal ledge protruding inwardly formed in the wall lying opposite the aperture symmetrically to the plane crossing the aperture, wherein the sheet metal sections of the horizontal braces are U-shaped or C-shaped whose longitudinal openings are directed towards the top or the bottom, and wherein the horizontal braces extend with their ends through the apertures of the posts and are connected to the flanges, the improvement which comprises that the horizontal braces extend with their ends into the sheet metal sections of the posts up to the wall lying opposite the aperture, and that the ends have a recess in which the longitudinal ledge of the post is received in a fork-like manner.

2. The shelf support structure according to claim 1, wherein each horizontal brace is attached at each flange of the posts through two rivet or screw connection, and a third rivet or screw connection is formed between the end of the horizontal brace and the post, the third connection effective between a lug in the area of the recess of the horizontal brace and the wall of the longitudinal ledge of the post.

3. The shelf support structure according to claim 2, wherein the two rivet or screw connections between the horizontal brace and the flanges of the posts are in axial alignment with each other and form a connecting articulation, and the third rivet or screw connection between the lug of the horizontal brace and the longitudinal bead ledge of the post acts as a stop for the connecting articulation.

4. The shelf support structure according to claim 1, comprising a diagonally extending compression rod connected with the horizontal braces.

5. The shelf support structure according to claim 4, wherein the compression rod has fork-shaped ends which engage the horizontal braces and detachable screw-pin connections connect the ends to the braces.

6. The shelf support structure according to claim 1, comprising side walls as stiffeners extending between two opposite posts and attached by means of screws in stepped portions of the posts bordered by the flanges of the aperture.

7. The shelf support structure according to claim 1, wherein the longitudinal ledge in the post has suspension members for the engagement of engagement members formed at the free legs of U-shaped or L-shaped coupling shoes of horizontal traverses, and wherein the coupling shoes embrace the cross-sectional area of the post in a matching manner, said area being bounded between the longitudinal side wall and its neighboring side wall of the longitudinal ledge.

8. The shelf support structure according to claim 7, wherein the longitudinal side wall of the post at its area adjacent to the longitudinal ledge has a stepped portion of reduced width relative to the area comprising the suspension members, the depth of the stepped portion at least approximately corresponding to the leg thickness at the coupling shoes.

9. The shelf support structure according to claim 8, wherein the coupling shoes comprise at their legs several lugs spaced one above the other, which lugs are arranged spaced from the corner of the shoe and protrude above the inner side of the leg by an amount which matches the depth of the stepped portion at the post.

10. The shelf support structure according to claim 9, wherein the stepped portions on the posts are inclined at an acute angle against the plane of the longitudinal side walls, and the side walls of the longitudinal ledge have an inclinational position opposite thereto and extend at an obtuse angle with respect to the base of the longitudinal ledge and the adjacent post wall section.

11. The shelf support structures accorcing to claim 10, wherein the leg of the coupling shoes has an inclinational position matched to the side walls of the longitudinal ledge at the post, and the depth of the lugs in the leg is matched to the inclinational position of the stepped portions at the post.

12. The shelf support structure according to claim 11, wherein the recess in the horizontal brace has a contour shape adapted to the inclinational position of the side walls of the longitudinal ledge and the front side ends of the horizontal brace in the engaged position are spaced from the post wall sections.

* * * * *